United States Patent
Sallé

(10) Patent No.: US 9,274,909 B2
(45) Date of Patent: Mar. 1, 2016

(54) METHOD AND APPARATUS FOR ERROR MANAGEMENT OF AN INTEGRATED CIRCUIT SYSTEM

(71) Applicant: Scaleo Chip, Valbonne, Sophia Antipolis (FR)

(72) Inventor: Bruno Sallé, Marseilles (FR)

(73) Assignee: Scaleo Chip, Valbonne, Sophia Antipolis (FR)

(*) Notice: Subject to any disclaimer, the term of this patent is extended or adjusted under 35 U.S.C. 154(b) by 42 days.

(21) Appl. No.: 14/084,222

(22) Filed: Nov. 19, 2013

(65) Prior Publication Data

US 2015/0058669 A1    Feb. 26, 2015

Related U.S. Application Data

(60) Provisional application No. 61/869,624, filed on Aug. 23, 2013.

(51) Int. Cl.
  *G06F 11/00* (2006.01)
  *G06F 11/22* (2006.01)
  *G06F 11/07* (2006.01)

(52) U.S. Cl.
  CPC ........ *G06F 11/2236* (2013.01); *G06F 11/0781* (2013.01); *G06F 11/22* (2013.01)

(58) Field of Classification Search
  CPC .................................................. G06F 11/0781
  USPC ..................... 714/48, 49, 50, 46, 2
  See application file for complete search history.

(56) References Cited

U.S. PATENT DOCUMENTS

| | | | |
|---|---|---|---|
| 4,727,548 A | | 2/1988 | Dickey |
| 5,291,499 A | | 3/1994 | Behrens et al. |
| 5,862,316 A | | 1/1999 | Hagersten et al. |
| 5,903,717 A | * | 5/1999 | Wardrop ........................ 714/12 |
| 5,933,614 A | * | 8/1999 | Tavallaei et al. .............. 710/306 |
| 6,105,107 A | | 8/2000 | Ho et al. |
| 6,446,224 B1 | * | 9/2002 | Chang et al. ..................... 714/54 |
| 6,948,092 B2 | * | 9/2005 | Kondo et al. .................... 714/12 |
| 7,051,249 B2 | | 5/2006 | Pham |
| 8,074,199 B2 | | 12/2011 | Millett et al. |
| 8,225,308 B2 | | 7/2012 | Sedukhin et al. |
| 8,402,183 B2 | | 3/2013 | Pelis et al. |
| 8,713,350 B2 | * | 4/2014 | Walton et al. ..................... 714/3 |
| 2006/0076418 A1 | | 4/2006 | Ostertun et al. |
| 2008/0126860 A1 | * | 5/2008 | Sampath et al. ................ 714/25 |
| 2008/0172217 A1 | | 7/2008 | Morizawa |
| 2008/0256415 A1 | | 10/2008 | Ostertun et al. |

* cited by examiner

Primary Examiner — Dieu-Minh Le
(74) Attorney, Agent, or Firm — Blakely Sokoloff Taylor & Zafman LLP

(57) ABSTRACT

An apparatus and method for error management in an integrated circuit system are presented. An error management unit (EMU) apparatus manages critical and non-critical errors that may be masked or non-masked. An EMU includes an EMU state machine, having a BOOT state, a CONFIG state, a FUNCT state, a WARNING state and an ERROR state. The method discloses transitions in the EMU state machine. While in the ERROR state an error reaction may be applied. The objective of the error reaction is to recover errors by software and hardware means. The EMU may further appropriately alert the system while in ERROR state and therefore be used as a safety mechanism permitting to collect error signals issued by fault detector units and can further cause action on faulty units for recovery purposes.

17 Claims, 3 Drawing Sheets

METHOD AND APPARATUS FOR ERROR MANAGEMENT OF AN INTEGRATED CIRCUIT SYSTEM

CROSS-REFERENCE TO RELATED APPLICATIONS

This application claims the benefit of U.S. Provisional Patent Application No. 61/869,624 filed Aug. 23, 2013.

BACKGROUND OF THE INVENTION

1. Field of the Invention

The invention generally relates to microelectronic circuitry safety mechanisms and particularly to error management in signals of the microelectronic circuitry.

2. Prior Art

As more and more electronics is replacing mechanical parts in systems requiring a high level of safety, such as vehicles, it is also necessary to improve significantly the handling of errors as they occur. These errors may be envisioned as potential problem areas during the design phase of a device but may also present themselves unexpectedly still requiring a safe reaction of the device. Error detection and error correction techniques are commonly used to overcome such errors and provide safer solutions to the market place. However, the increase in the number of errors needing to be controlled and the differences between critical and non-critical errors require more sophisticated approaches to overcome the risks associated therewith.

In particular, and with the multiple types of errors that may present themselves, it is necessary to be able to respond in a prioritized manner to a collection of detected errors that may have different priorities. For example, an error may be presented that is a critical error however two non-critical errors appearing at the same time may have in combination a higher severity than that of the single critical error. Moreover, it may be the case where a particular sequence of non-critical errors may be in fact a critical error. It would therefore be advantageous to provide a solution that enables error control that overcomes deficiencies of the prior art and provide a system equipped with such a solution with the ability to overcome or otherwise safely handle a variety of errors.

BRIEF DESCRIPTION OF THE DRAWINGS

The subject matter that is regarded as the invention is particularly pointed out and distinctly claimed in the claims at the conclusion of the specification. The foregoing and other objects, features and advantages of the invention will be apparent from the following detailed description taken in conjunction with the accompanying drawings.

DETAILED DESCRIPTION OF THE PREFERRED EMBODIMENTS

Glossary of Terms

Figure 1:
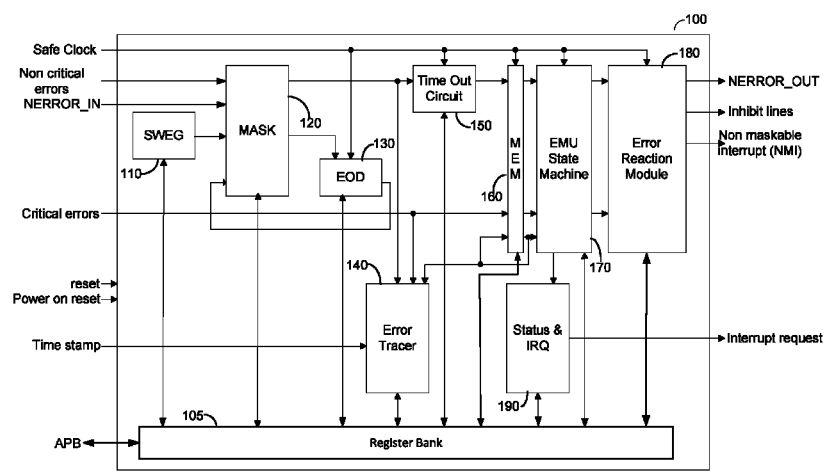
FIG. 1 is a block diagram of an Error Management Unit (EMU) according to an embodiment.

| | |
|---|---|
| APB | Advanced Peripheral Bus |
| BOOT | Boot State of the EMU state machine |
| CEi | Critical Error number "i" |
| CONFIG | Configuration State of the EMU state machine |
| CPU | Central Processing Unit |
| ECC | Error Correcting Code |
| EMU | Error Management Unit |
| EMU_CR | Control Register of the Error Management Unit |
| EMU_CSR | Clear Status Register of the Error Management Unit |
| EMU_IDR | Interrupt Disable Register of the Error Management Unit |
| EMU_IER | Interrupt Enable Register of the Error Management Unit |
| EMU_IMR | Interrupt Mask Register of the Error Management Unit |
| EMU_NCE_SWCR | Non Critical Error Software Control Register of the Error Management Unit |
| EMU_SR | Status Register of the Error Management Unit |
| EMU_SR | Status Register of the EMU state machine |
| EOD | Error Overflow Detector |
| EOD_NCE | Error Overflow Detector Non Critical Error |
| ERM | Error Reaction Module |
| ERROR | Error State of the EMU state machine |
| ET | Error Tracer |
| ETB | Error Trace Buffer |
| FUNCT | Functional State of the EMU state machine |
| GEEC | Global Error Event Counter |
| IRQ | Interrupt ReQuest |
| LOCK | LOCK bit of the Control Register or Status register of the Error Management Unit |
| MEM | Multiple Error Manager |
| NCEi | Non Critical Error number "i" |
| NHWRST | Negative HardWare system ReSeT |
| NMI | Non Maskable Interrupt |
| NPORST | Negative Power On ReSeT |
| SCLK | System CLocK |
| SFCLK | SaFe CLocK |
| SW_NCE | Software Non Critical Error |
| SWEG | Software Error Generator |
| TOMR | Time-Out Mask Register |
| UNLOCK | UNLOCK bit of the Control Register or Status Register of the Error Management Unit |
| WARNING | Warning State of the EMU state machine |

It is important to note that the embodiments disclosed by the invention are only examples of the many advantageous uses of the innovative teachings herein. In general, statements made in the specification of the present application do not necessarily limit any of the various claims. Moreover, some statements may apply to some inventive features but not to others. In general, unless otherwise indicated, singular elements may be in plural and vice versa with no loss of generality. In the drawings, like numerals refer to like parts through several views.

An apparatus and method for error management in an integrated circuit system are presented. An error management unit (EMU) apparatus manages critical and non-critical errors that may be masked or non-masked. An EMU includes an EMU state machine, having a BOOT state, a CONFIG state, a FUNCT state, a WARNING state and an ERROR state. The method discloses transitions in the EMU state machine. While in the ERROR state an error reaction request may be asserted by the EMU to an error reaction module so that an error reaction may be applied. The objective of the error reaction is to recover errors by software and hardware means. The EMU may further appropriately alert the system while in ERROR state and therefore be used as a safety mechanism permitting to collect error signals issued by fault detector units and can further cause action on faulty units for recovery purposes.

Figure 2:
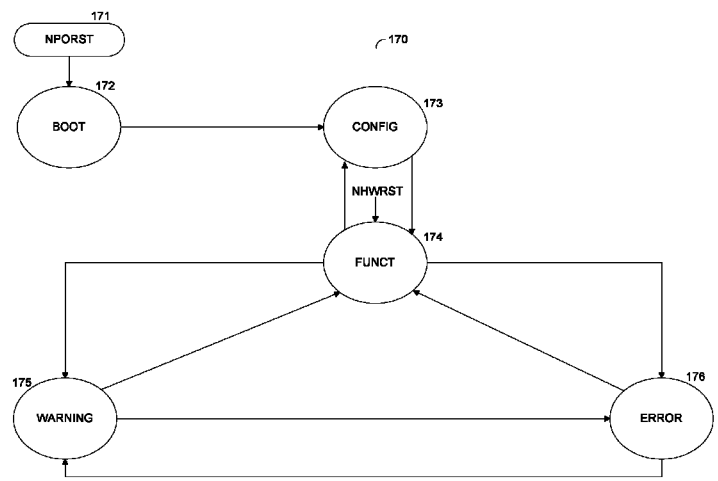
FIG. 2 is a state machine diagram of an EMU according to an embodiment.

Reference is made to FIGS. 1 and 2. FIG. 1 is a non-limiting exemplary block diagram of an Error Management Unit (EMU) 100 according to an embodiment. FIG. 2 is a non-limiting exemplary state machine diagram 170 of an EMU 100 according to an embodiment. An error management unit (EMU) manages two types of errors—critical and non-critical errors. A critical error i (CEi) is non-maskable, and a CEi signaling leads directly to a transition from FUNCT state 174 to ERROR state 176 in the EMU state machine 170. An EMU state machine contains five states: BOOT state 172, CONFIG state 173, FUNCT state 174, WARNING state 175 and ERROR state 176. The FUNCT state 174 is the EMU's functional state in which no error is signaled. In ERROR state 176, the EMU 100 applies an error reaction through error reaction module 180, using a Non-Maskable Interrupt (NMI) and activation of inhibit lines. Any non-critical error i (NCEi) is maskable. An NCEi can be un-masked by setting a bit NCEi in a Non-Critical Error Enable Register in MASK module 120. All the registers discussed herein are part of a register bank 105 and programmed via, for example, an advanced peripheral bus (APB). The NCEi can be masked by setting the bit NCEi in a Non-Critical Error Disable Register in MASK module 120. The Non Critical Error Mask Register in MASK module 120 returns the NCEi mask status. A masked NCEi signaling leaves the EMU 100 in the same state it entered. The masked NCEi additionally updates the Error Overflow Detector (EOD) 130 counter. An unmasked NCEi signaling causes a transition to the WARNING state 175 or to the ERROR state 176, depending on a dedicated timeout configuration.

In an embodiment where the timeout 150 is enabled for the NCEi, the EMU state machine 170 moves from FUNCT state 174 to WARNING state 175. The timeout 150 may be enabled for NCEi by setting the bit NCEi in the register Non Critical Error TimeOut Enable. The timeout 150 may be disabled for NCEi by setting the bit NCEi in the register Non Critical Error TimeOut Disable. The Non Critical Error TimeOut Mask Registers give back the timeout mask for each non critical error. The timeout duration is configured through the Non Critical Error TimeOut register. During this lapse, the EMU 100 may receive instructions, e.g., software or firmware embedded or external, in an attempt to recover the non critical error i (NCEi). If the timeout elapses, the EMU state machine 170 moves from WARNING state 175 to ERROR state 176 and additionally applies an error reaction through the error reaction module 180. In an embodiment where the timeout is disabled for the NCEi, the EMU state machine 170 moves from FUNCT state 174 to ERROR state 176 and applies an error reaction through the error reaction module 180.

The EMU state machine 170 is in BOOT state 172 when the power on reset (NPORST) 171 is active (i.e., at low level). While NPORST 171 is active, the EMU state machine 170 remains in BOOT state 172. During this time the NERROR_OUT pin is forced to active level (i.e. low level). When the NPORST 171 is released (high level), the EMU remains in BOOT state 172 until the NERROR_OUT pin is forced to high level by setting the bit EO in the Control Register. The EMU state machine 170 leaves BOOT state 172 and goes to CONFIG state 173 once the NERROR_OUT pin is at high level. In an embodiment, if one or more errors (critical error or non-critical error) are signaled while the EMU state machine 170 is in BOOT state 172, these errors will be taken into account once the EMU state machine 170 is in FUNCT state 174. One of ordinary skill in the art would readily appreciate that the active low and active high signaling is provided merely for the purpose of illustration and other strategies may be employed without departing from the scope of the invention.

CONFIG state 173 is the only state that allows the configuring of the EMU 100. Configuration is performed through a configuration bus. The configuration bus may be, but is not limited to, an APB. Configuration of the error reaction module 180 may be performed. The EMU state machine 170 leaves the CONFIG state 173 and moves to FUNCT state 174 by setting the bit FUNCT in the Control Register. If one or more errors (critical error, unmasked non critical error or masked non critical error) are signaled while the EMU state machine 170 is in CONFIG state 173, these errors will be taken in account once the EMU state machine 170 is in FUNCT state 174.

FUNCT state 174 is the functional state which the EMU state machine 170 is in while no errors occur. The EMU state machine 170 leaves the FUNCT state 174 and moves to CONFIG state 173 by setting the bit CONFIG in the Control Register. In an embodiment, if at least one critical error is signaled, the EMU state machine 170 moves to ERROR state 176. In another embodiment, if an unmasked non-critical error occurs and the timeout is enabled for this non critical error, the timeout counter starts and the EMU state machine 170 moves to WARNING state 175. In yet another embodiment, if an unmasked non-critical error occurs and the timeout is disabled for this non critical error, the EMU state machine 170 moves to ERROR state 176. A transition between FUNCT state 174 to ERROR state 176 has priority over a transition of FUNCT state 174 to WARNING state 175. In a non-limiting example, if an unmasked non critical error with timeout enabled is signaled at the same time as a critical error, the EMU state machine 170 may move to ERROR state 176. When the system reset NHWRST is active, the EMU state machine 170 moves to FUNCT state 174 irrespective of the state in which the state machine 170 was present.

In WARNING state 175 only unmasked non-critical errors are signaled and a timeout is started if the bits corresponding to the signaled non critical errors are set to high level in the Timeout Mask Register (TOMR). An interrupt request is issued by the Status & IRQ module 190 upon the EMU state machine 170 entering WARNING state 175. Within this timeout period, a recovery attempt is made to recover each remaining non-critical error. In an embodiment, if a critical error occurs or if an unmasked non critical error whose corresponding bit is set to low level in the Timeout Mask Register (TOMR) is signaled, the EMU state machine 170 moves to ERROR state 176. In this case, the timeout is stopped. If the timeout elapses before all the non-critical errors are recovered, i.e., the system was not able to recover the non-critical error during the timeout period, the EMU state machine 170 moves to ERROR state 176 and the timeout is reinitialized. In another embodiment if all the non-critical errors are recovered before the timeout elapses, the EMU state machine 170 goes to FUNCT state 174 and the timeout is reinitialized. If another unmasked non critical error with timeout enabled is signaled before the timeout elapses, the EMU state machine 170 remains in WARNING state 175 and the timeout continues its count without being reinitialized (the timeout starts at the first non-critical error). Hence, when the EMU is in WARNING state 175, it does not try to recover the error, rather, it signals an interrupt request to inform the system that one or several non-critical errors have been detected. This allows the system to recover from such errors, for example, by software routines executed on a processor, during a predefined timeout. If the system succeeds in recovering from the errors, the EMU moves to FUNCT state 174 and the timeout is cleared. If the timeout elapses, it means that the system was unable to recover from these non-critical errors. In this case, the EMU moves to the ERROR state 176 and applies the error response.

In the ERROR state 176, critical errors and/or unmasked non-critical errors (i.e., non-critical error whose timeout is disabled, or non-critical errors whose timeout has elapsed) are signaled, and the EMU 100 may react by activating the Non Maskable Interrupt (NMI) and the inhibit lines through the error reaction module 180, in accordance with the error reaction configuration. The objective of the error reaction module 180 is to recover the one or more errors by software, hardware or a combination thereof. Moreover, in ERROR state 176, the EMU 100 can alert the system level through the NERROR_OUT pin activation, which is considered as a special inhibit line. If all critical errors and all non-critical errors are recovered, the EMU state machine 170 leaves ERROR state 176 and goes to FUNCT state 174 and the timeout is reinitialized. If all critical errors are recovered but it remains non critical errors with timeout enabled and not yet elapsed, the EMU state machine 170 leaves ERROR state 176 and moves to WARNING state 175. The timeout is restarted from the value it had before leaving the WARNING state 175 to ERROR state 176.

Each error (critical or non-critical) is associated with a configurable error reaction, which consists of activating at least one inhibit line once the EMU state machine 170 moves to the ERROR state 176. Activation of each inhibit line is also configurable and permits short pulse, long pulse or permanent active level on each inhibit line. The inhibit lines go back to their inactive level once the EMU state machine 170 leaves the ERROR state 176. In case of multiple errors signaling, and if the error reaction for each error stimulates the same inhibit line, the rule is that the heaviest reaction will be applied on the inhibit line.

Moreover, each state transition can produce the activation of the interrupt request (IRQ) through the Status & IRQ module 190 if the corresponding interrupt source is enabled. For this, the state transition bit (CONFIG, FUNCT, WARNING or ERROR) of the Interrupt Enable Register (EMU_IER) shall be set to high level. Each interrupt source (CONFIG, FUNCT, WARNING or ERROR) is disabled by setting the corresponding bit in the Interrupt Disable Register (EMU_IDR). The interrupt mask status is given back by the Interrupt Mask Register. If the state transition bit (CONFIG, FUNCT, WARNING or ERROR) is set to high level in the EMU_IMR register, the interrupt request IRQ is activated once the respective bit is set in the EMU_SR register. To clear any state transition bit in the EMU_SR, the corresponding bit shall be set to high level in the Clear Status Register EMU_CSR.

With respect to recovery modes, the EMU 100 distinguishes between two distinct error types—hardware recoverable errors and software recoverable errors. Each error is declared as hardware recoverable or software recoverable using dedicated configuration registers during the CONFIG state 173. A hardware recoverable error signal is activated as long as the error cause has not been removed. For example, a clock monitor unit may signal an error while the monitored clock is not at the expected frequency. When the clock is recovered, (for example by switching to a redundant safe clock) the clock monitor unit drives the error line to inactive level. A software recoverable error is without defined time duration. When the error signal goes back to inactive level, the cause of the error has not necessarily been resolved. The error recovery is signaled to the EMU 100 by a software procedure, such as status/flag register clearing. The Error Correcting Code (ECC) error signaling is one such non-limiting example. For example, if a data is corrupted in a memory, the ECC unit detects a mismatch between data and parity bits when the data is accessed and signals an error. As soon as another data is accessed and if this data is correct, the ECC unit releases the error signal. This does not mean that the previous error has been removed.

The EMU further includes an Error Overflow Detector (EOD) 130 which generates a non-critical error EOD_NCE (Error Overflow Detector Non Critical Error) if the number of masked non critical errors occurrence exceeds a definite threshold. The EOD 130 counts all the masked non critical errors, except the EOD_NCE itself. The un-masked errors are not taken in account by the EOD 130. The EOD 130 includes a counter and an alarm. Whenever a masked non-critical error occurs, the EOD counter is incremented. The EOD counter is cleared when NPORST reset line is activated. The EOD counter is also auto-cleared when it reaches the EOD alarm value.

The EMU 100 provides a software error generator (SWEG) 110 which can generate a non-critical error SW_NCE (Software Non Critical Error) through a software command, by writing in the Non Critical Error Software Control Register EMU_NCE_SWCR. When the application set the SW_NCE in the EMU_NCE_SWCR, the SWEG 110 generates a negative pulse on SW_NCE. This implies that the SW_NCE recovery mode shall be configured as software recoverable during CONFIG state 173.

The EMU 100 provides an input NERROR_IN signal that shall be supplied by an external input pin and that may be assigned to a non-critical error. If NERROR_IN is not used, it may be tied to inactive level.

The EMU 100 provides an output NERROR_OUT signal that can be connected to an external output pin. NERROR_OUT has two functions. NERROR_OUT may be used as inhibit line during EMU 100 application of error reaction through error reaction module 180, to signal to the top-level system that the EMU 100 (and therefore the micro controller embedding the EMU) is in an ERROR state. NERROR_OUT may be additionally assigned to a dedicated inhibit line. NERROR_OUT is also used to warn the top-level system when the EMU 100 and the micro controller embedding the EMU 100 are not yet ready. On such non-limiting example is when the micro controller boots and the EMU 100 is not configured (which is not the case after a system reset NHWRST activation). In this case, meaning when the micro controller boots after power on reset, the EMU 100 is in BOOT state 172 and the NERROR_OUT pin is at low level. The only way to release the NERROR_OUT pin to high level is to set the EO bit in the EMU_CR register, so EMU state machine 170 moves to the CONFIG state 173.

The EMU 100 further provides a lock/unlock mechanism whose objective is to avoid any unintentional configuration change. The EMU 100 configuration is locked by setting a bit LOCK to high level in the EMU_CR (EMU Control Register). The EMU 100 configuration is unlocked by setting the bit UNLOCK to high level in the EMU_CR. The EMU lock/unlock state is given back by the LOCK bit in the EMU_SR (EMU Status Register).

A Multiple Error Manager (MEM) 160 permits to manage situations where several errors are signaled together and where a specific reaction to multiple error is necessary, this reaction being different than the addition or combination of reaction to each single error constitutive of the multiple error.

For example two or more non-critical errors can be considered as safe when they are signaled alone. However, they may become unsafe when they are signaled together. In another example two or more critical errors signaled together must lead to a special error reaction that can be assimilated to a full safe state application. Such is the case where a system using redundancy detects an error on a main unit, and another error on the auxiliary unit, the auxiliary unit ensuring the redundancy of the main unit and so, the continuity of service. If both units fail and, if this situation affects a safety goal, the best reaction may be to put the whole system in a full safe state. The MEM 160 may generate a critical error in case of dual errors signaling. Dual errors may be a combination of two critical errors, two non-masked non-critical errors, one critical error and one non-masked non-critical error, etc. The MEM 160 can generate a critical error in case of multiple errors signaling, any error (critical or not critical) can be associated with any other error (critical or not critical) by software configuration, any critical error issued by the MEM 160 can be enabled or disabled by software configuration. In addition, a replacement policy can be configured for any critical error issued by the MEM 160. In an embodiment any critical error issued by the MEM 160 can replace the initial multiple errors. This is known as multiple error management with replacement policy. In another embodiment, any critical error issued by the MEM 160 can be added to the initial multiple errors. This is known as multiple error management without replacement policy. Additional embodiments may have a replacement policy for some cases and not for others.

Figure 3:
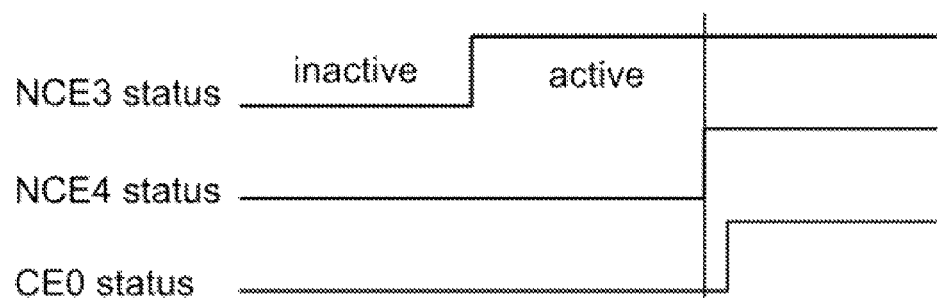
FIG. 3 is a graph illustrating dual error management without replacement policy.

Reference is now made to FIG. 3, which is a non-limiting exemplary graph illustrating dual error management without replacement policy. This example illustrates the basic use of MEM 160, where a critical error shall be generated by the MEM 160 in addition to two initial errors. In this example, critical error 0 (CE0) must be signaled by the MEM 160 when non-critical errors 3 and 4 (NCE3 and NCE4) are signaled. As NCE3 and NCE4 are non-critical, they shall be unmasked to make effective CE0 signaling. CE0 shall be signaled in addition to the initial errors NCE3 and NCE4, meaning that NCE3 and NCE4 status flag remain at high level in the EMU_NCE_SR0 register while non-critical error 3 and non-critical error 4 are not recovered.

Figure 4:
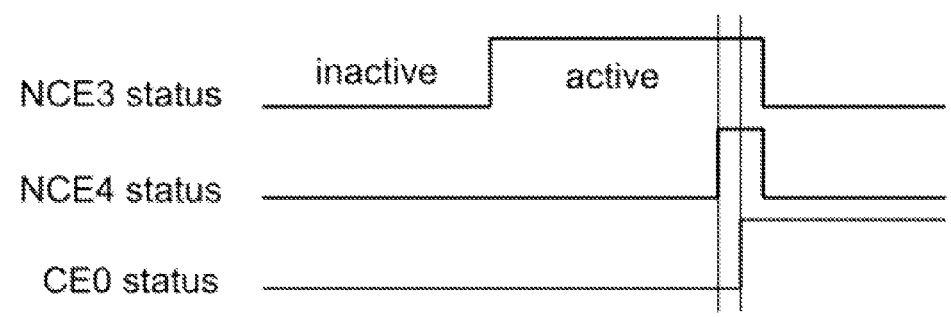
FIG. 4 is a graph illustrating dual error management with replacement policy.

FIG. 4 is a non-limiting exemplary graph illustrating dual error management with replacement policy. This example illustrates the use case where the critical error generated by the MEM 160 replaces the dual initial errors. Critical Error 0 (CE0) must be signaled by the MEM 160 when initial dual errors NCE3 and NCE4 are signaled. As NCE3 and NCE4 are non-critical, they shall be unmasked to make effective CE0 signaling. CE0 shall be signaled in replacement to the initial errors NCE3 and NCE4, meaning that NCE3 and NCE4 status flag are cleared in the EMU_NCE_SR0 register, even if the non-critical error 3 and non-critical error 4 signals are still active and declared as hardware recoverable in the EMU_NCE_CFR0 register.

Figure 5:
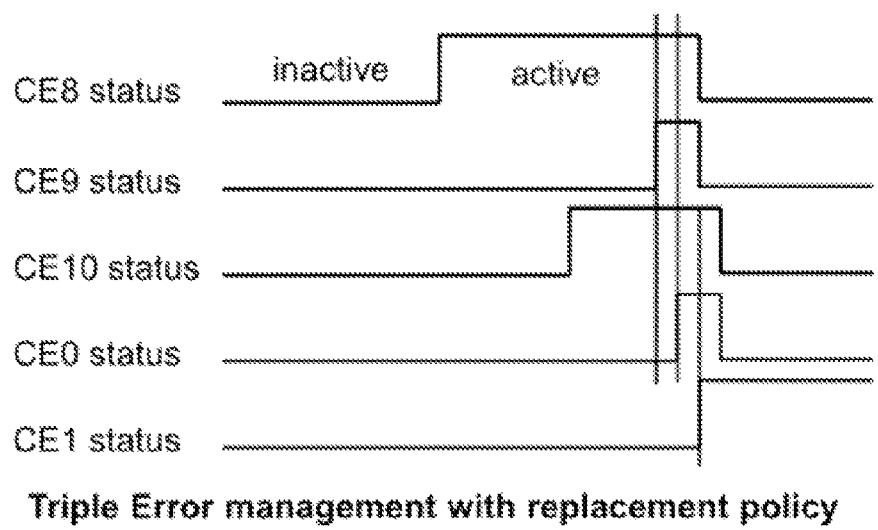
FIG. 5 is a graph illustrating triple error management with replacement policy.

FIG. 5 is a non-limiting exemplary graph illustrating triple error management with replacement policy. This example illustrates a case where the critical error generated by the MEM 160 replaces three initial errors. It will be readily appreciated that this example can be extended to four, five or more errors management without departing from the scope of the disclosure. Critical Error 1 (CE1) must be signaled by the MEM 160 when critical errors 8, 9 and 10 (CE8, CE9 and CE10) are signaled. To perform this, the mechanism is decomposed according to the following principle: Critical error 0 (CE0) must be generated by the MEM 160 and replaces the errors CE8 and CE9. Critical error 1 (CE1) must be generated by the MEM 160 and replaces the errors CE0 and CE10. The result will be that CE1 will be generated by the MEM 160 when initials errors CE8, CE9 and CE10 are signaled together. Moreover, CE1 signaling will replace CE8, CE9, CE10 and also CE0 signaling, meaning that CE0, CE8, CE9 and CE10 status flag are cleared in the EMU_CE_SR0 register, even if critical error 8, 9 and 10 signals (coming from external safety mechanisms) are still active and declared as hardware recoverable.

EMU 100 further includes an Error Tracer 140, which traces critical errors and unmasked non-critical errors that have occurred and the time when they have occurred since power on reset. For this, an Error Trace Buffer (ETB) is used. Each time an error occurs, a circular error event counter increments and the error tracer records the error identifier and the time stamp in the ETB at a position identified by the circular error event counter value. Moreover, a global error event counter (GEEC) is also incremented. If two or more errors occur at the same time stamp, the error trace is duplicated in the ETB with the same time stamp and the respective error identifiers. GEEC is reinitialized only at power on reset (i.e. NPORST at low level). GEEC informs on the number of errors that have occurred since the last power on reset. GEEC is reinitialized at power on reset (i.e. NPORST at low level) and each time it reaches the error event number value.

The EMU uses two clock signals—SCLK (the system clock, used for EMU 100 registers access through configuration bus) and SFCLK (the safe clock, used for critical error and non-critical error signaling detection, timeout generation 150, EMU state machine 170, Status & IRQ module 190 and error reaction module 180. The safe clock shall be protected by safety mechanism using clock monitoring (for clock failure detection) and redundant/backup clock (for clock recovering). In case of error signaled, the EMU 100 is able to react and apply the error reaction module 180 (covered by NMI and inhibit lines activation) as configured during the CONFIG state 173, even if the system clock SCLK is failing.

Additionally, the EMU 100 uses two reset signals. NHWRST, which is the system reset which when active causes the EMU configuration and the EMU trace buffer to remain unchanged, but forces the EMU state machine 170 to move to FUNCT state 174, so that the EMU 100 is ready to react in case errors are signaled (since the EMU is already configured). NPORST is the power on reset. The power on reset activation resets the EMU configuration and the EMU trace buffer forces the EMU state machine 170 to move to BOOT state 172.

The principles of the invention are implemented as hardware, firmware, software or any combination thereof, including but not limited to an integrated circuit. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. An Error Management Unit comprising:
   a circuit for collection of any of critical errors and non-critical errors;
   an error reaction module, the error reaction module configured to determine the necessary operation of the Error Management Unit responsive to collected any of critical errors and non-critical errors;
   a state machine for controlling the Error Management Unit, the state machine configured to operate in:
      a first state present when the Error Management Unit power is reset;
      a second state present when the Error Management Unit may be configured;
      a third state present when no errors are detected as occurring;
      a fourth state present when at least an unmasked non-critical error is signaled and timeout of the at least an unmasked non-critical error is enabled; and,
      a fifth state present when at least a critical error or at least an unmasked non-critical error is detected and the Error Management Unit applies an error reaction request to the error reaction module; and
   a configuration interface for receiving external configuration information for the Error Management Unit with respect to at least a reaction to the any of critical errors and non-critical errors and any combination thereof.

2. The Error Management Unit of claim 1, wherein the circuit for collection comprises:
   an error tracer, wherein the error tracer is configured to trace the critical errors of the any of critical errors and non-critical errors and further configured to trace unmasked non-critical errors of the any of critical errors and non-critical errors.

3. The Error Management Unit of claim 1, further comprising:
   a Multiple Error Manager, the Multiple Error Manager being operative to manage a plurality of errors, the errors being signaled respective of each other.

4. The Error Management Unit of claim 3, wherein the Multiple Error Manager is operative to manage a plurality of errors of the any of critical errors and non-critical errors with one of: a replacement policy or a no-replacement policy.

5. The Error Management Unit of claim 3, wherein the Multiple Error Manager generates a critical error signal in response to two non-critical errors of the any of critical errors and non-critical errors, the two non-critical errors being identified as unmasked and hardware recoverable.

6. The Error Management Unit of claim 3, wherein the Multiple Error Manager generates a critical error signal in response to three non-critical errors of the any of critical errors and non-critical errors, the three non-critical errors being identified as unmasked and hardware recoverable.

7. The Error Management Unit of claim 3, wherein the Multiple Error Manager generates a critical error signal in response to two non-critical errors of the any of critical errors and non-critical errors, the two non-critical errors being identified as unmasked and not recoverable.

8. The Error Management Unit of claim 3, wherein the Multiple Error Manager generates a critical error signal in response to a plurality of non-critical error signals of the any of critical errors and non-critical errors, the plurality of non-critical error signals being identified as unmasked.

9. The Error Management Unit of claim 8, wherein the plurality of non-critical error signals are cleared and only the critical error is signaled.

10. A method for error control by a state machine of an error management unit, the method comprising:
    causing the state machine to reach a first state responsive to a power reset of the Error Management Unit;
    causing the state machine to reach a second state responsive of a configuration signal for Error Management Unit configuration;
    causing the state machine to reach a third state responsive to detection of an occurrence of at least an error;
    causing the state machine to reach a fourth state responsive to at least an unmasked non-critical error of the at least an error is signaled and timeout of the at least an unmasked non-critical error is enabled; and
    causing the state machine to reach a fifth state responsive to at least a critical error of the at least an error or at least an unmasked non-critical error of the at least an error is detected responsive of the Error Management Unit asserting an error reaction request.

11. The method of claim 10, further comprising:
    managing a plurality of errors respective of the at least an error, the errors being signaled respective of each other.

12. The method of claim 11, wherein managing a plurality of errors is performed with one of: a replacement policy or a no-replacement policy.

13. The method of claim 11, further comprising:
    generating a critical error signal in response to two non-critical errors, the two non-critical errors being unmasked and hardware recoverable.

14. The method of claim 11, further comprising:
    generating a critical error signal in response to three non-critical errors, the three non-critical errors being unmasked and hardware recoverable.

15. The method of claim 11, further comprising:
    generating a critical error signal in response to two non-critical errors, the two non-critical errors being unmasked and are not recoverable.

16. The method of claim 11, further comprising:
    generating a critical error signal in response to a plurality of non-critical error signals, the plurality of non-critical error signals being unmasked.

17. The method of claim 16, wherein the plurality of non-critical error signals are cleared and only the critical error is signaled.

* * * * *